United States Patent
Nanaji

[11] Patent Number: 6,065,507
[45] Date of Patent: May 23, 2000

[54] ONBOARD VAPOR RECOVERY VEHICLE FILL NECK VAPOR BLOCK

[75] Inventor: Seifollah S. Nanaji, Greensboro, N.C.

[73] Assignee: Gilbarco Inc., Greensboro, N.C.

[21] Appl. No.: 09/041,151

[22] Filed: Mar. 12, 1998

[51] Int. Cl.[7] .................................................. B65B 31/00
[52] U.S. Cl. ............................ 141/59; 141/44; 141/286; 141/382; 141/391; 220/86.2
[58] Field of Search ................ 141/5, 7, 44, 59, 141/286, 368, 382, 383, 389, 391, 312; 220/86.2; 137/588

[56] References Cited

U.S. PATENT DOCUMENTS

| | | | |
|---|---|---|---|
| 2,576,192 | 11/1951 | Poznik | 220/86 |
| 3,903,942 | 9/1975 | Vest | 141/301 |
| 4,166,485 | 9/1979 | Wokas | 141/52 |
| 4,760,933 | 8/1988 | Christner et al. | 220/86 |
| 4,822,054 | 4/1989 | Christner et al. | 277/12 |
| 4,932,444 | 6/1990 | Micek | 141/59 |
| 5,035,272 | 7/1991 | Kawase | 141/312 |
| 5,165,379 | 11/1992 | Thompson | 123/520 |
| 5,562,133 | 10/1996 | Mitchell | 141/206 |
| 5,568,828 | 10/1996 | Harris | 141/348 |
| 5,590,697 | 1/1997 | Benjey et al. | 141/59 |
| 5,671,785 | 9/1997 | Andersson | 141/59 |
| 5,782,275 | 7/1998 | Hartsell, Jr. et al. | 141/94 |
| 5,839,489 | 11/1998 | Ganachaud et al. | 220/86.2 |
| 5,850,857 | 12/1998 | Simpson | 141/59 |

*Primary Examiner*—Steven O. Douglas
*Assistant Examiner*—Timothy L. Maust
*Attorney, Agent, or Firm*—Coats & Bennett, P.L.L.C.

[57] ABSTRACT

A device for detecting the presence of an ORVR-equipped vehicle having a fuel tank filler pipe including an annular vapor block mounted in the fuel tank filler pipe. The vapor block has sufficient length to substantially block vapor flow through a plurality of vapor return openings in a vacuum assist nozzle spout and further includes an internal diameter complementary with the outside diameter of the nozzle so as to prevent the creation of a vapor tight seal.

17 Claims, 6 Drawing Sheets

ONBOARD VAPOR RECOVERY VEHICLE FILL NECK VAPOR BLOCK

BACKGROUND OF THE INVENTION

The present invention relates generally to vapor recovery systems associated with both automobiles and fuel dispensers. More particularly, the invention relates to a fill neck vapor block for ORVR-equipped vehicles and its use as a means to detect the presence of an ORVR vehicle.

For the past several years, the environmental regulations have imposed limits on the amount of fuel vapor released into the atmosphere during the refueling of a motor vehicle. During a non-vapor-recovery fueling operation, incoming fuel displaces fuel vapor from the head space of an automobile fuel tank, forcing the vapors out through the filler pipe into the atmosphere. The air pollution resulting from this situation is undesirable. Currently, many fuel dispensing pumps at service stations are equipped with vapor recovery systems that collect fuel vapor in the fuel tank filler pipe during the fueling operation and transfer the vapor to a fuel storage tank. Many of these systems include a vapor pump to positively move vapor from the filler pipe to the service station's fuel tanks and are commonly referred to as vacuum assist systems.

Recently, onboard, or vehicle-carried, fuel vapor recovery and storage systems (commonly referred to as onboard recovery vapor recovery, or ORVR) have been developed, in which the head space in the vehicle fuel tank is vented through an activated carbon filled canister so that the vapor is adsorbed by the activated carbon. Subsequently, the fuel vapor is withdrawn from the canister into the engine intake manifold for mixture and combustion with the normal fuel and air mixture.

In typical ORVR systems, a canister outlet is connected to the intake manifold of the vehicle engine through a normally closed purge valve. The canister is intermittently subjected to the intake manifold vacuum with the opening and closing of the purge valve between the canister and intake manifold. A computer which monitors various vehicle operating conditions controls the opening and closing of the purge valve to assure that the fuel mixture established by the fuel injection system is not overly enriched by the addition of fuel vapor from the canister to the mixture. An example of an ORVR system is described in U.S. Pat. No. 4,887,578 to Woodcock et al.

Fuel dispensing systems having vacuum assisted vapor recovery capability which are unable to detect ORVR systems ingest excessive air into the underground storage tank and cause excessive pressure build-up in the underground storage tank due to the delivery of air rather than fuel vapor. The air causes further liquid fuel vaporization leading to "vapor growth." Recognizing an ORVR system and adjusting the operation of the fuel dispenser's vapor recovery system accordingly eliminates the redundancy and problems associated with operating two vapor recovery systems for one fueling operation. The problem of incompatibility of assisted vapor recovery and ORVR was discussed in "Estimated Hydrocarbon Emissions of Phase II and Onboard Vapor Recovery Systems" dated Apr. 12, 1994, amended May 24, 1994, by the California Air Resources Board. That paper suggests the use of a "smart" interface on a nozzle to detect an ORVR vehicle and prevent the return of vapors through the nozzle when an ORVR vehicle is being filled. However, such a nozzle may prove expensive and may require excessive maintenance.

Adjusting the operation of the fuel dispenser's vacuum assist vapor recovery system will mitigate fugitive emissions by reducing underground tank pressure. Reducing underground tank pressure minimizes the "breathing" associated with pressure differentials between the underground tank and ambient pressure levels. If the vacuum created by the fuel dispenser's vapor recovery system is not reduced or shut off, the underground tank pressure will increase with the result that hydrocarbons will be released through piping leaks or a pressure vacuum valve or breathing cap associated with the underground tank.

Thus, there remains a need for a vapor recovery system modification having the ability to modify vacuum assist system operation when an ORVR system is present on the vehicle being fueled to reduce breathing losses.

SUMMARY OF THE INVENTION

The present invention relates to detecting the presence of an ORVR -equipped vehicle and modifying the operation of a vacuum assist vapor recovery system responsive thereto. a fill neck vapor block for detecting the presence of an ORVR-equipped vehicle having a fuel tank filler pipe comprising a vapor block mounted in the fuel tank filler pipe, the vapor block having sufficient length to substantially block vapor flow through a plurality of vapor return openings in a vacuum assist nozzle spout, the vapor block further including an internal diameter complementary with the outside diameter of the nozzle so as to prevent the creation of a vapor tight seal.

The invention also relates to a method for detecting the presence of an ORVR-equipped vehicle having a fuel tank filler pipe and adjusting the operation of a vacuum assist vapor recovery system including a vacuum assist nozzle, a vapor return path from the nozzle to a vacuum pump. The method includes providing a vapor block mounted in the fuel tank filler pipe, the vapor block having sufficient length to substantially cover a set of vapor return openings in a vacuum assist delivery nozzle. The vapor block may further include an internal diameter complementary with the outside diameter of the vacuum assist gasoline nozzle so as to prevent the creation of a vapor tight seal. The method also includes monitoring the pressure in the vapor return path and modifying the operation of the vapor pump when an unsafe pressure level is detected in the vapor return path. This modification could include either slowing or stopping the operation of the vapor pump.

The present invention also includes a method for modifying the operation of a vacuum assist vapor recovery system responsive to the detection of a blocked vapor return path. The method comprises establishing a motor amperage value indicative of a blocked vapor return passage, monitoring the motor running amperage and comparing the motor running amperage to the blocked vapor return passage amperage. The operation of the vapor pump is modified if the motor running amperage exceeds the blocked vapor return passage amperage for a predetermined length of time. Fuel delivery is continued after modifying operation of the vapor pump.

Therefore one aspect of the present invention is to provide a simple, low cost system for detecting an ORVR vehicle during a vehicle fueling operation.

Another aspect of the present invention is to provide a vehicle tank fill pipe vapor block for providing a substantial but not a complete seal of the vapor return openings in a vapor recovery nozzle.

Yet another aspect of the present invention includes modifying the operation of a vacuum assist vapor pump responsive to the substantial blockage of the pump's vapor return path.

These and other aspects of the present invention will become apparent to those skilled in the art after a reading of the following description of the preferred embodiments when considered in conjunction with the drawings.

DESCRIPTION OF THE PREFERRED EMBODIMENTS

Figure 1:
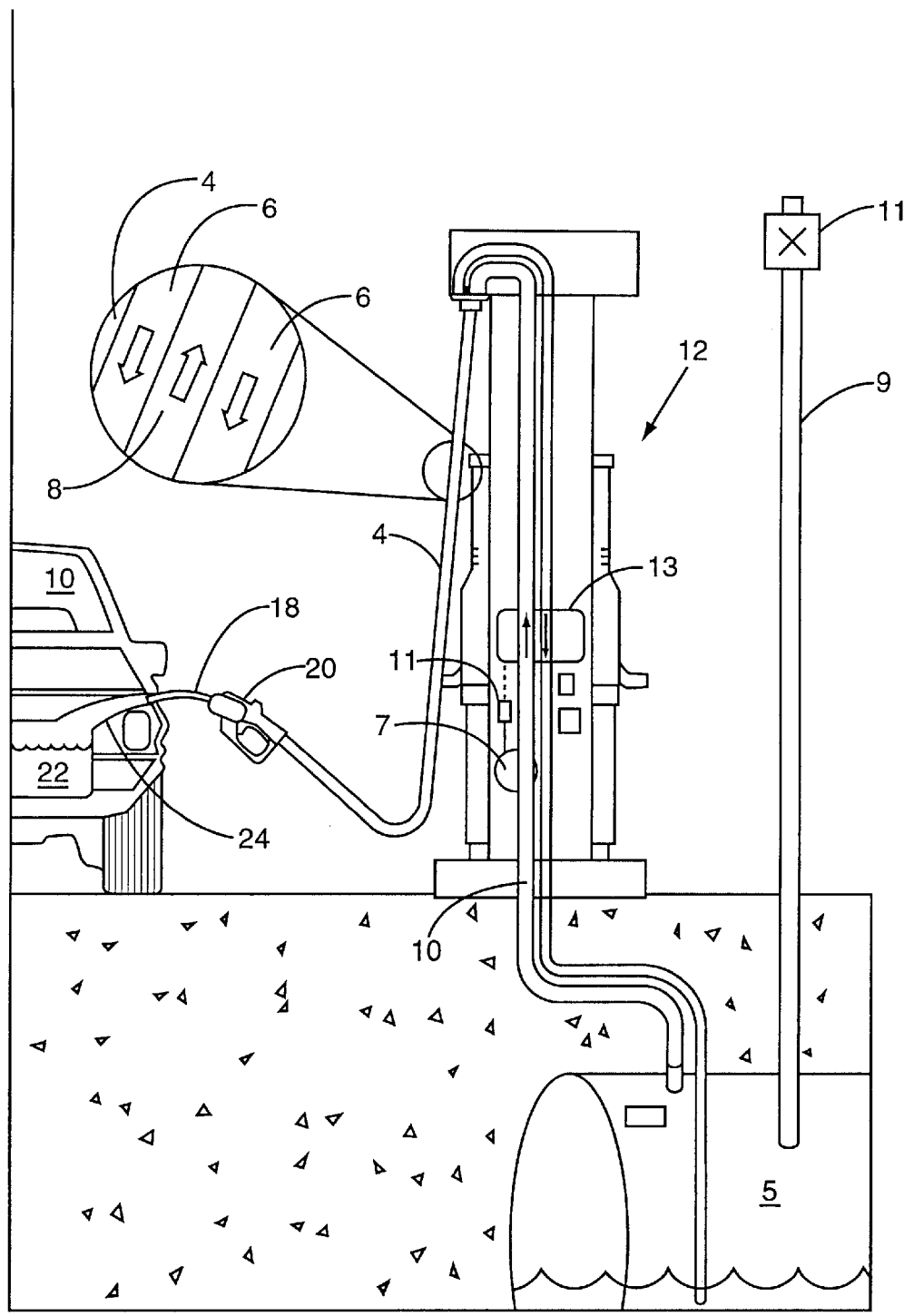
FIG. 1 is an elevation and partial sectional view of a typical gasoline dispensing installation having a vacuum assist vapor recovery system.

Referring now to the drawings in general, it will be understood that the illustrations are for the purpose of describing a preferred embodiment of the invention and are not intended to limit the invention thereto. As best seen in FIG. 1, in a typical service station, an automobile 10 is shown being fueled from a gasoline dispenser or pump 12. A spout 18 of nozzle 20 is shown inserted into a filler pipe 24 of a fuel tank 22 during the refueling of the automobile 10.

A fuel delivery hose 4 having vapor recovery capability is connected at one end to the nozzle 20, and at its other end to the fuel dispenser 12. As shown by the cutaway view of the interior of the fuel delivery hose 4, an annular fuel delivery passageway 6 is formed within the fuel delivery hose 4 for distributing gasoline pumped from an underground storage tank 5 to the nozzle 20. Also within the fuel delivery hose 4 is a tubular vapor recovery passageway 8 for transferring fuel vapors expelled from the vehicle's fuel tank 22 to the underground storage tank 5 during the fueling of a vehicle that is not equipped with an onboard vapor recovery system.

A vapor recovery pump 7 provides a vacuum in the vapor recovery passage 8 for removing fuel vapor during a refueling operation. The vapor recovery pump 7 may be placed along the vapor recovery passage 8 between the nozzle 20 and the underground fuel storage tank 5. The vapor recovery system using the pump 7 may be any suitable system such as those shown in U.S. Pat. No. 5,040,577 to Pope, U.S. Pat. No. 5,195,564 to Spalding, U.S. Pat. No. 5,333,655 to Bergamini et al., or U.S. Pat. No. 3,016,928 to Brandt. Various ones of these systems are now in commercial use, recovering vapor during refueling of conventional, non-ORVR vehicles. The present invention addresses an adaptation of the filler pipe 24 and vacuum assist vapor recovery system for use with ORVR vehicles.

As shown in FIG. 1, the underground tank 5 includes a vent pipe 9 and a pressure-vacuum vent valve 11 for venting the underground tank 5 to atmosphere. The vent 9 and vent valve 11 allow the underground tank 5 to breathe, in order to substantially equalize the ambient and tank pressures. In typical applications, maintaining tank pressure between the limits of pressure and vacuum is sufficient. Typical ranges of pressure and vacuum will range between +3 inches of water to −8 inches of water.

Figure 2:
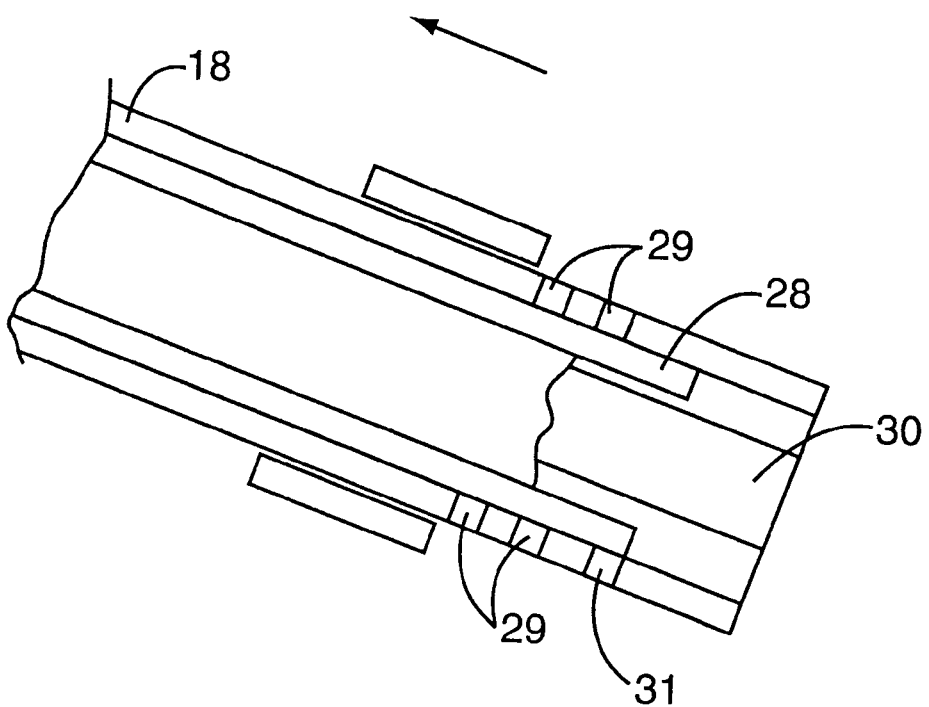
FIG. 2 is a partial sectional view of the spout of a vacuum assist vapor recovery nozzle.

The typical arrangement in a vacuum assist vapor recovery nozzle for the return of vapors to an underground tank is shown in the nozzle spout partial sectional view of FIG. 2. Spout 18 includes a fuel passage 30, which has a coaxial relationship with vapor passage 28. A plurality of vapor inlets 29 communicate with vapor passage 28 to provide a vapor return path through the spout, the nozzle body and thence to fuel delivery hose 4. The vapor inlets 29 allow fuel vapors to enter the vapor recovery path 8 of fuel dispenser 12 from the vehicle's filler pipe 24. As liquid fuel rushes into the fuel tank 22 during fueling, fuel vapors are forced out of the fuel tank 22 through the fill pipe 24. The fuel dispenser's vapor recovery system pulls fuel vapor through the vapor inlets 29, along the vapor recovery path 8 and ultimately into the underground tank 5 (as shown in FIG. 1). Aspirator opening 31 is provided to shut down flow through the nozzle when a pressure threshold is met or when the opening is blocked. In a typical nozzle a tube is attached to this opening for communication with the mechanism that stops flow when one of the foregoing conditions is met. That tube is not shown in this figure for clarity.

As discussed above, an excessive amount of air may also be drawn from the fill pipe into the underground tank.

Figure 3:
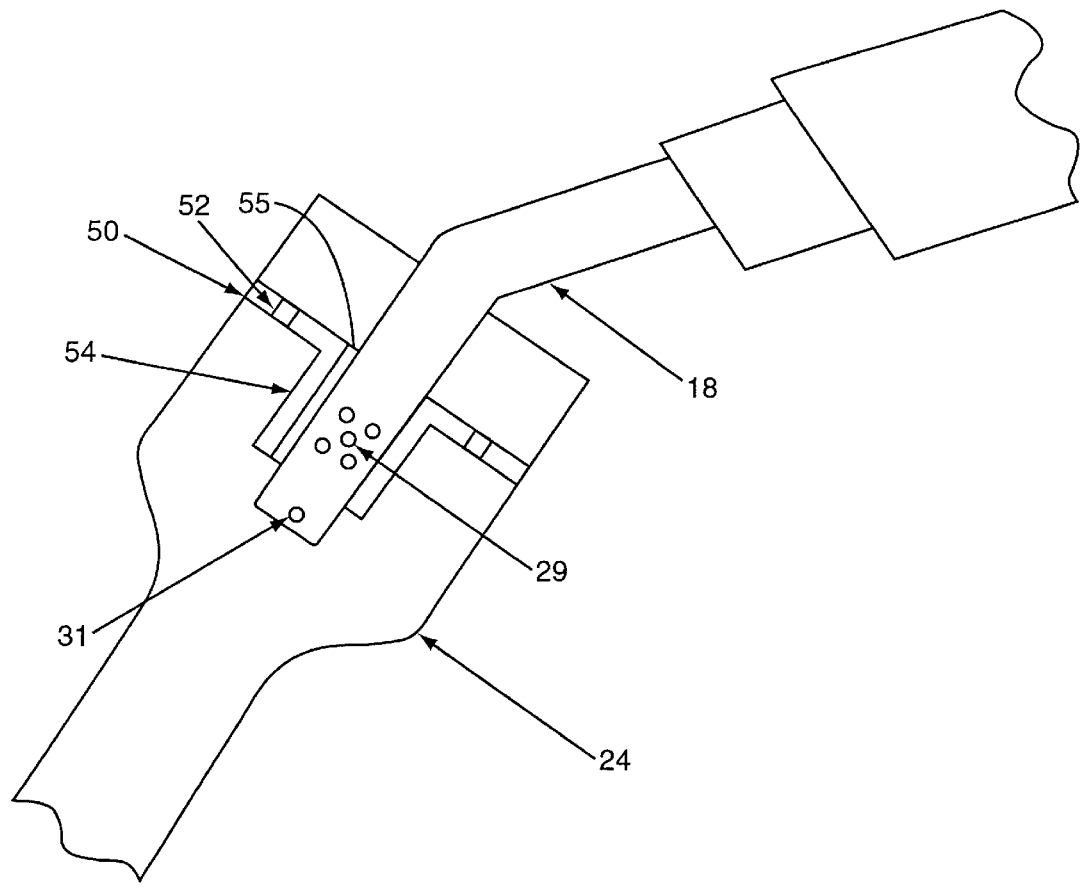
FIG. 3 is cutaway view of a vacuum assist vapor recovery nozzle inserted into the filler pipe of an ORVR-equipped vehicle incorporating the annular vapor block of the present invention.

FIG. 3 shows a typical vacuum assist vapor recovery nozzle positioned in a vehicle equipped with an ORVR system modified according to the present invention. Modern day vehicle fill pipes include a restricter plate 50 which is normally outfitted with a flapper (not shown) covering an opening sized to receive a conventional unleaded gasoline nozzle 18. The restricter plate 50 includes openings 52 for venting the fill pipe to atmosphere. The practice of the present invention does not include covering those openings or sealing the fill pipe completely from atmosphere. Nozzle spout 18 is shown inserted into filler pipe 24 through opening 55 formed by annular vapor block 54, which in this embodiment is formed as an integral part of restricter plate 50. The term "integral" refers to a single, continuous piece that includes both restricter plate and annular vapor block. Vapor block 54 has sufficient length to substantially impede vapor flow by covering the plurality of vapor return openings 29. Vapor block 54 has an internal diameter complementary with the outside diameter of spout 18 so as to prevent the creation of a vapor tight seal, but the fit between the spout 18 and annular vapor block 54 should be sufficient to block a substantial amount of the vapor flow that otherwise would flow through openings 29. The length of annular vapor block 54 should be sufficient to cover vapor return openings 29, without blocking aspirator opening 31 and thus shutting off the nozzle 20 prematurely.

Annular vapor block 54 may be constructed from any material having the strength to withstand the rigors of repeated insertions of a nozzle spout therethrough. A preferred material is metal such a aluminum. It is believed that a high strength engineered plastic such as polyphenylene sulfide (PPS) may also be suitable. There are many PPS formulations readily available commercially. In addition to the required strength characteristics, the material used for this component must be compatible with vehicle fuels to include gasoline, diesel fuel and their additives.

Figure 4:
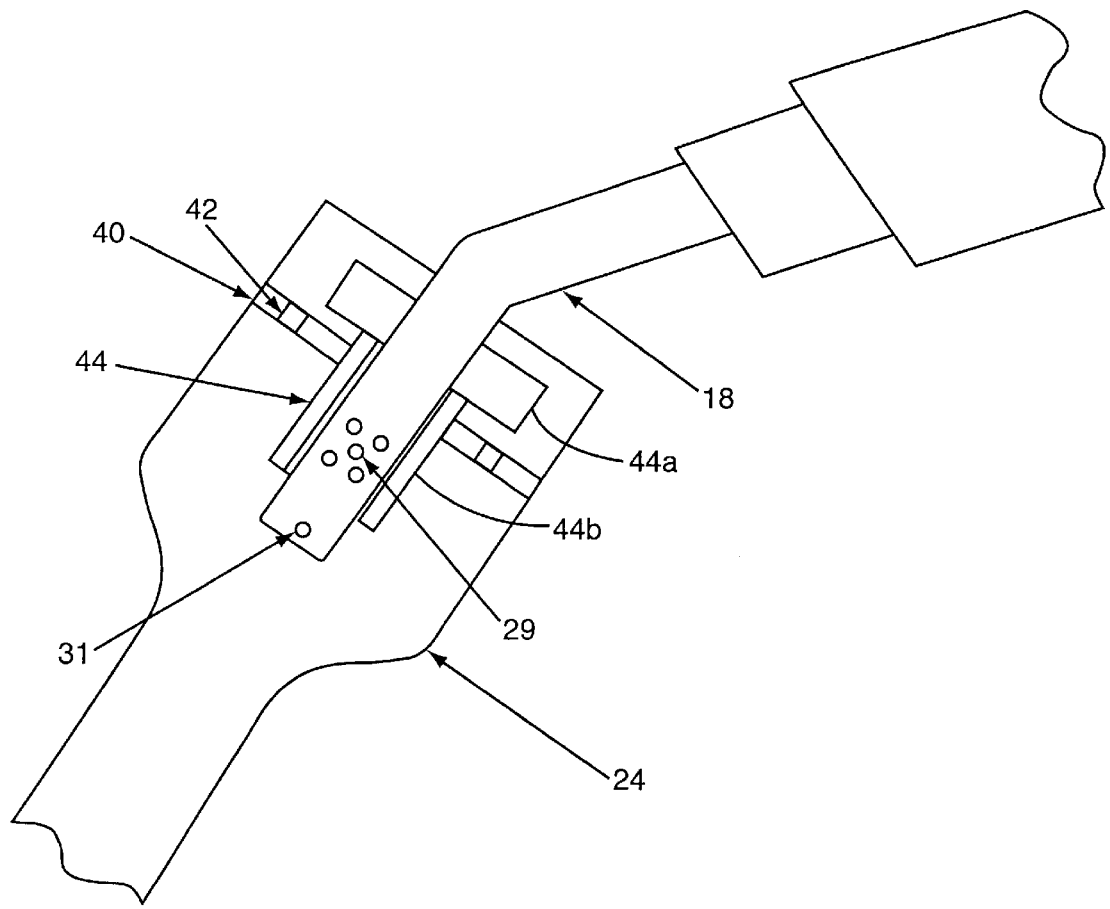
FIG. 4 is a cutaway view of a retrofit version of the annular vapor block of the present invention.

The invention also encompasses kits, modules and the like for retrofitting ORVR-equipped vehicles. An alternative embodiment of this type is shown in FIG. 4 where a retrofit-type annular vapor block 44 inserted into an opening in a restricter plate 40 having openings 42. Vapor block comprises a flange 44a which rests on the upper side of restricter plate 40 and a tube 44b extending therefrom. Flange 44a functions to hold tube 44b in proper position in restricter plate 40. Vapor block 44 engages restricter plate 40 with a tight press fit. Other vapor block configurations may be used, depending on the geometry of the vehicle fill pipe 24.

Figure 5:
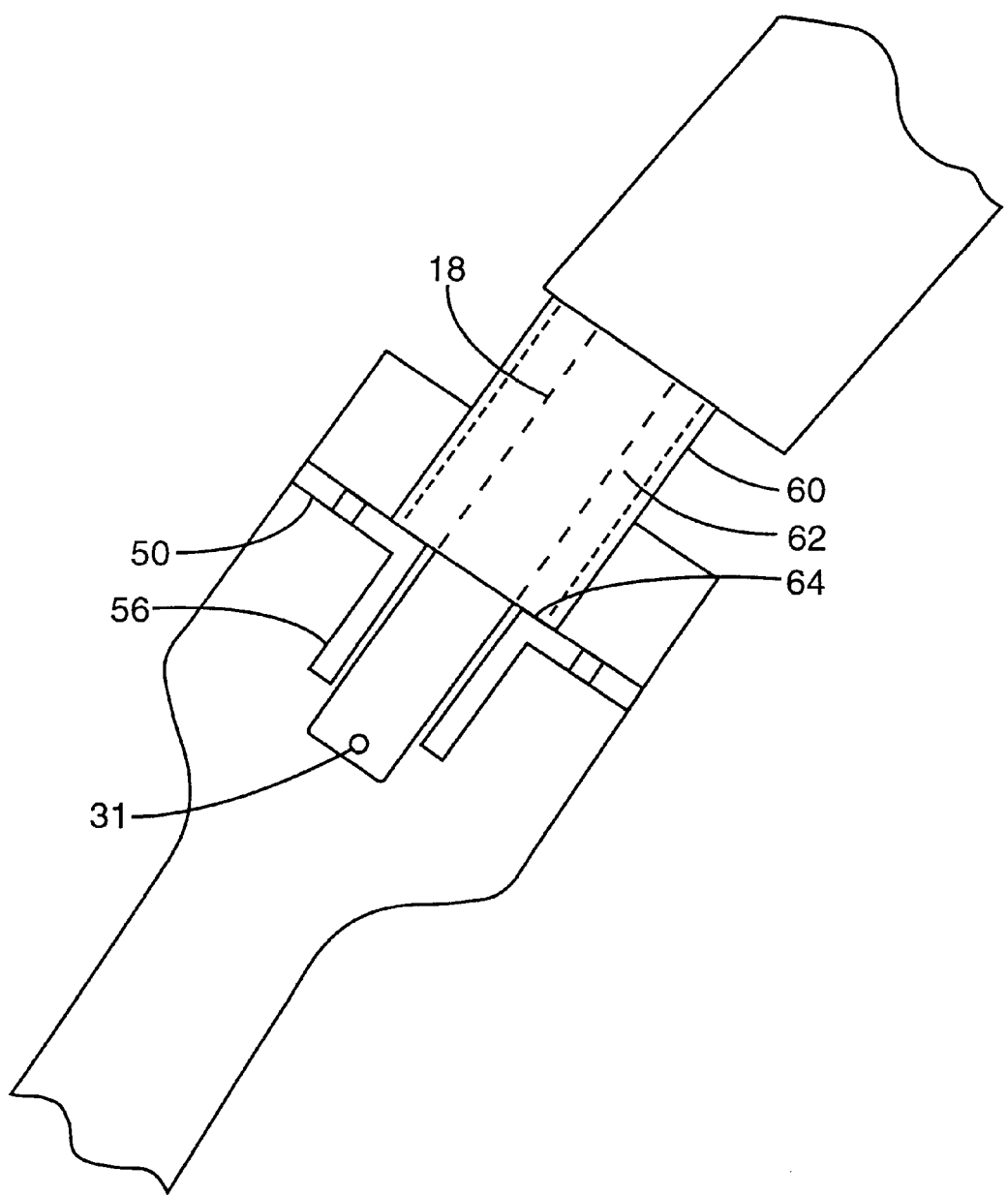
FIG. 5 is a cutaway view of the annular vapor block of the present invention used with an alternative embodiment of a vacuum assist vapor recovery nozzle.

Another alternative embodiment is shown in FIG. 5 where a vacuum assist nozzle not having vapor inlets is used. This nozzle includes a hood 60 mounted on the nozzle body and surrounding spout 18. The hood is generally cylindrically shaped but includes whatever curvature is necessary to maintain a concentric relationship with spout 18. It will be readily appreciated that the concentric relationship between spout 18 and hood 60 defines an annular vapor return path 62 therebetween and an annular vapor inlet 64 near the end of spout 18. Restricter plate 50 provides a sealing engagement the annular vapor inlet 64 to prevent the ingestion of excess air into the annular vapor return path. This embodiment includes tube member 56 whose length is selected to ensure that spout 18 is inserted far enough into the fill neck to provide a seal between restricter plate 50 and hood 60. Tube member 56 should be sized so that the nozzle must be extended into the fill pipe until aspirator opening 31 clears tube member 56. It will be readily apparent that if the customer inserts the nozzle only partially, then tube member 56 will cause the nozzle to sense an overfill condition and not function. Only when the customer has inserted the nozzle far enough to clear aspirator opening 31 and simultaneously provide a seal against restricter plate 50 will product flow occur.

As discussed above, annular vapor block 54 prevents substantially all of the vapors from entering the nozzle vapor inlets 29 and entering tubular vapor recovery passageway 8. After this blockage is in place, if vapor pump 7 is permitted to continue to remove vapors from the now impeded vapor return path 8, there arises the potential for damage to the pump or to other system components to occur. One approach to deal with this problem is to provide an internal bypass or recirculation path integral with the pump to permit it to run for some period of time in a blocked condition.

Another approach is to modify vapor pump operation responsive to this condition. Known systems for modifying vapor pump operation during automobile fueling are described in U.S. Pat. Nos. 5,269,353 and 5,355,915 ("the '915 patent") the content of which is incorporated herein by reference. The system disclosed in the '915 patent addresses a blockage of the vapor return openings 29 resulting from a so-called "splash back" or backup of fuel into the vapor return openings 29. The '915 patent system shuts down the gasoline dispenser responsive to this condition. However, in the practice of the present invention it is desirable to continue fuel delivery after a condition similar to "splash back" has been detected with only vapor pump operation being adjusted. Therefore a new method is required to deal with a situation that may appear to be a fuel backup but in fact is a desirable substantial blockage of the vapor return path.

A preferred method for addressing this situation is illustrated with reference to FIG. 1 and the logic chart shown in FIG. 6. Vapor pump 7 is driven by electric motor 11 the operation of which is controlled by controller 13 located in dispenser 12. The dotted line connection between controller 13 and electric motor 11 represents: 1) a control signal provided to motor 11 that controls motor operating speed, and 2) a signal provided to controller 13 indicative of the amperage being drawn by motor 11. The motor amperage is proportional to the vacuum in the vapor return path 8. That is, as the motor driven vacuum pump expends more energy as will be the case when the vapor return passageway 8 is blocked, the amperage drawn by electric motor 11 will increase. Thus, the controller functions as a means for monitoring the vacuum level in the vapor return path by monitoring the motor amperage and modifying the operation of vacuum pump 7 responsive to a change in the vacuum level. Also, although controller 13 is shown as a separate component in FIG. 1, its function may be integrated into other dispenser electronics components.

Figure 6:
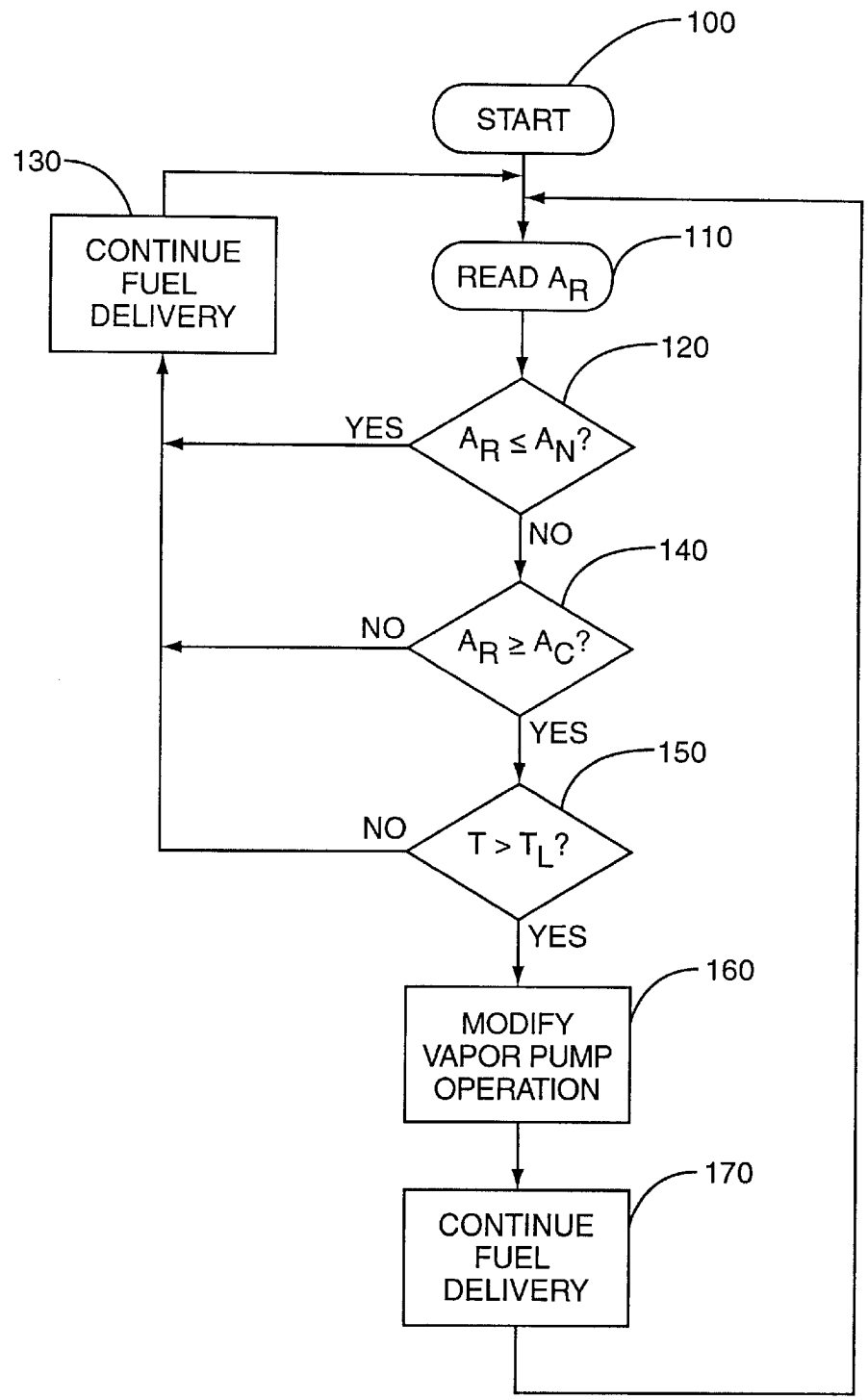
FIG. 6 is a schematic block diagram of a method for controlling the operation of a vapor pump responsive to the amperage drawn by the motor driving the pump.

The control scheme shown in FIG. 6 is based on electric motor 11 having a normal operating amperage. ($A_N$) Another value may be established for the amperage drawn by the motor when the vapor line is closed by annular vapor block 54. ($A_C$) Having established and stored these values in controller 13, the vacuum assist vapor recovery system is started at 100. Next at 110 the running amperage ($A_R$) supplied to the vapor pump motor is read. At decision block 120 $A_R$ is compared to $A_N$. If $A_R$ is equal to or less than $A_N$ indicating that the vapor return passageway 8 is unblocked, then the decision block returns to 130 and continues to operate vapor pump 7. If this decision block answers "No," then the process moves to decision block 140 where $A_R$ is compared to $A_C$. If $A_R$ is equal or greater than $A_C$, the process moves to decision block 150 where the amount of time that this condition has existed is determined and compared to a predetermined time limit. ($T_L$) Once $T_L$ has been exceeded, the operation of the vapor pump is modified as indicated at 160. This modification could include stopping the pump. However, fuel delivery continues 170 because the vapor path blockage was caused by annular vapor block 54 and not by a transitory splash-back or any malfunction of the vapor recovery system. $T_L$ should be selected to exclude motor start-up transient amperages and excessive motor current caused by splash-back.

Other control options are available for the vapor pump when the conditions at decision blocks 140 and 150 are met. By way of non-limiting example, the vapor pump speed could be reduced to an idle speed such that the pump could continue to run without causing damage to the pump or to other system components. Alternatively, the vapor pump could be provided with a recirculation line so that the vacuum pump could take suction from and discharge to an idle space without damage to the pump.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

We claim:

1. A system for detecting the presence of an ORVR-equipped vehicle having fuel tank filler pipe comprising:

a) a vacuum assist nozzle having a plurality of vapor return openings;

b) a fuel dispenser connected to the vacuum assist nozzle and having a vapor return path extending from the nozzle to a vacuum pump capable of maintaining a vacuum level;

b) an annular vapor block adapted to be mounted in the fuel tank filler pipe, the vapor block having sufficient length to substantially block vapor flow through the plurality of vapor return openings in the vacuum assist nozzle spout to the vapor return path, the vapor block further including an internal diameter complementary with the outside diameter of the nozzle so as to prevent the creation of a vapor tight seal whereby the vapor block causes an increase in vacuum level in the vapor return path; and c) a controller mounted in the dispenser for monitoring the vacuum level in the vapor return path and modifying the operation of a vacuum pump responsive to a change in the vacuum level.

2. The system of claim 1 wherein said controller slows the operation of the vapor pump responsive to a change in the vacuum level.

3. The system of claim 1 wherein said controller stops the operation of the vapor pump responsive to a change in the vacuum level.

4. The system of claim 1 wherein the annular vapor block is formed integral with the fuel tank filler pipe.

5. The system of claim 1 wherein the annular vapor block comprises an insert into the fuel tank filler pipe.

6. A method of detecting the presence of an ORVR-equipped vehicle having a fuel tank filler pipe and adjusting the operation of a vacuum assist vapor recovery system including a vacuum assist nozzle, and a vapor return path from the nozzle to a vacuum pump, the method comprising:

a) selecting an annular vapor block mounted in the fuel tank filler pipe, the vapor block having sufficient length to substantially cover a set of vapor return openings in a vacuum assist nozzle and an internal diameter complementary with the outside diameter of the vacuum assist nozzle so as to prevent the creation of a vapor tight seal between them when the nozzle is inserted in the vapor block;

b) locating the annular vapor block in the fuel tank filler pipe to cover the nozzle vapor return openings;

c) pumping the fuel to the tank;

d) monitoring the pressure in the vapor return path; and e) modifying the operation of the vapor pump when an unsafe pressure level is detected in the vapor return path.

7. The method of claim 6 wherein the step of modifying comprises slowing the operation of the vapor pump.

8. The method of claim 6 wherein the step of modifying comprises stopping operation of the vapor pump.

9. The method of claim 6 wherein the step of modifying comprises recirculating vapor around the vapor pump.

10. A system for detecting the presence of an ORVR-equipped vehicle having a fuel tank filler pipe as the vehicle is being fueled by a vacuum assist vapor recovery system including a motor-driven vacuum pump connected to a vapor return path comprising:

a) an annular vapor block mounted in the fuel tank filler pipe, the vapor block having sufficient length to substantially block vapor flow through a plurality of vapor return openings in a vacuum assist nozzle spout to a vapor return path, the vapor block further including an internal diameter complementary with the outside diameter of a vacuum assist nozzle spout so as to prevent the creation of a vapor tight seal whereby the blockage caused by the annular vapor block causes an increased vacuum in the vapor return path;

b) a controller connected to the vacuum pump for monitoring the vacuum in the vapor return path and modifying the operation of the vacuum pump responsive to the increased vacuum in the vapor return path.

11. The system of claim 10 wherein the controller is adapted to modify vacuum pump operation by slowing the operation of the vapor pump.

12. The system of claim 10 wherein the controller is adapted to modify vacuum pump operation by stopping operation of the vapor pump.

13. The system of claim 10 wherein the controller is adapted to modify vacuum pump operation by recirculating vapor around the vapor pump.

14. A vapor recovery fuel dispenser and vehicle equipped with an ORVR vapor recovery system comprising: a fuel dispenser comprising:

a) a fuel flow path;

b) a vapor recovery path, including a vapor pump to pump recovered vapor;

c) a nozzle connected to the fuel flow path and said vapor recovery path and having a fuel outlet opening and a vapor recovery opening, whereby vapor released as fuel is dispensed is recovered through the vapor recovery opening, and d) a controller for monitoring the pressure in the vapor recovery path and controlling vapor pump operation wherein the controller is adapted to modify vapor pump operation upon sensing a reduction in pressure caused by a blockage any of said vapor recovery opening by a vapor block on an ORVR-equipped vehicle; and a vehicle comprising an ORVR vapor recovery system and a fuel tank filler pipe outfitted with a vapor block to block said vapor recovery opening.

15. A vehicle equipped with an ORVR vapor recovery system the vehicle including:

a) a fuel tank filler pipe;

b) an annular vapor block mounted in the fuel tank filler pipe, the vapor block having sufficient length to substantially cover a set of vapor return openings in a vacuum assist nozzle to substantially block vapor flow through the plurality of vapor return openings to the vapor return path and an internal diameter complementary with the outside diameter of the vacuum assist nozzle so as to prevent the creation of a vapor tight seal between them when the nozzle is inserted in the vapor block.

16. A system for preventing excessive air ingestion into the vapor return path of an ORVR-equipped vehicle having a fuel tank filler pipe comprising:

a) a vacuum assist nozzle having a nozzle spout including a plurality of vapor return openings;

b) a fuel dispenser connected to the vacuum assist nozzle and having a vapor return path extending from the nozzle to a vacuum pump capable of maintaining a vacuum level;

b) an annular vapor block mounted in the fuel tank filler pipe, the vapor block having sufficient length to substantially block vapor flow through the plurality of vapor return openings to the vapor return path, the vapor block further including an internal diameter complementary with the outside diameter of the nozzle so as to prevent the creation of a vapor tight seal.

17. A system for preventing excessive air ingestion into the vapor return path of an ORVR-equipped vehicle having a fuel tank filler pipe comprising:

a) a vacuum assist nozzle having a nozzle spout including a hood attached to the nozzle and surrounding the spout to define an annular vapor return path therebetween and an annularly-shaped vapor inlet;

b) a fuel dispenser connected to the vacuum assist nozzle and having a vapor return path extending from the annular vapor return path to a vacuum pump capable of maintaining a vacuum level;

b) a restricter plate mounted in the fuel tank filler pipe for sealing engagement with the annular vapor inlet c) an annular tube member integral with the restricter plate forming an annular vapor block, having an internal diameter complementary with the outside diameter of the nozzle spout wherein the vapor block is of sufficient length to substantially block vapor flow through the plurality of vapor return openings to the vapor return path.

* * * * *